(No Model.)

G. S. KELSEY.
BICYCLE HANDLE.

No. 296,973. Patented Apr. 15, 1884.

WITNESSES
Joseph Ashbaugh.
Irving H. Baker.

INVENTOR,
George Seeley Kelsey,
By his Atty.
Henry W. Williams.

United States Patent Office.

GEORGE SEELEY KELSEY, OF BIRMINGHAM, COUNTY OF WARWICK, ENGLAND, ASSIGNOR TO BENJAMIN KELSEY, OF SAME PLACE.

BICYCLE-HANDLE.

SPECIFICATION forming part of Letters Patent No. 296,973, dated April 15, 1884.

Application filed November 26, 1883. (No model.) Patented in England September 4, 1882, No. 4,200.

*To all whom it may concern:*

Be it known that I, GEORGE SEELEY KELSEY, a subject of the Queen of Great Britain and Ireland, residing at Birmingham, in the county of Warwick, England, have invented new and useful Improvements in Handles for Bicycles and Tricycles, (for which I have obtained a patent in Great Britain, No. 4,200, bearing date September 4, 1882,) of which the following is a specification.

It is well known that when the hands are caused to grasp handles for any length of time—as in guiding bicycles, tricycles, and other velocipedes—the heat of the hands is imparted to and retained by such handles, resulting in discomfort to the operator and an unpleasant production of moisture upon the handles. I remedy this difficulty in this invention by making such handles hollow, and providing the shells thus produced with numerous longitudinal slots or openings, whereby a firm grip is obtained upon them. The weight of the handles is greatly reduced, and the circulation of air in and through them prevents them from becoming heated and moist, and the comfort of the operator is increased in using the same.

Figure 1:
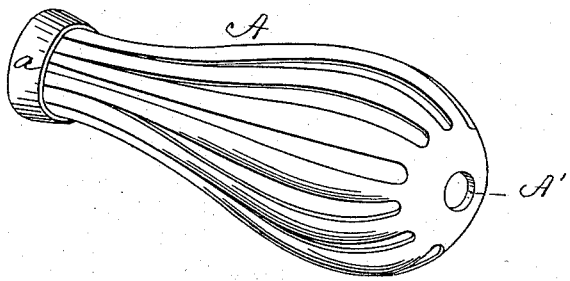
Figure 2:
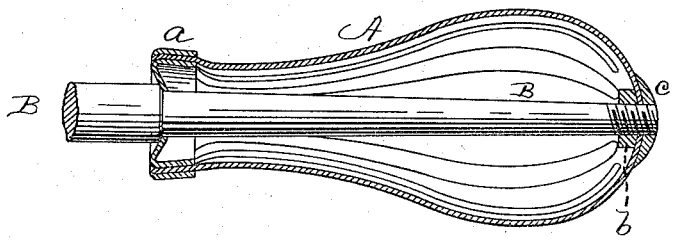
Figure 3:
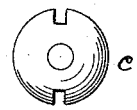
Figure 4:
Figure 5:
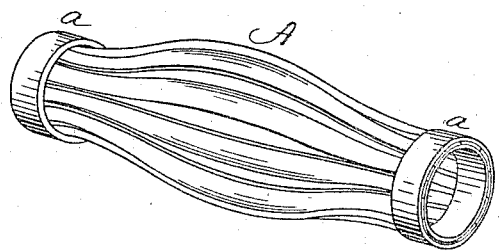

In the accompanying drawings, in which similar letters of reference indicate like parts, Figure 1 is a view in perspective of a handle especially adapted for a bicycle, and embodying my invention. Fig. 2 is a longitudinal section of the same secured to the guiding-bar of a bicycle. Figs. 3 and 4 are plan views of the nuts by which said handle is attached in the preceding figure. Fig. 5 is a view in perspective of a handle especially adapted for a tricycle, and embodying my invention.

A represents a hollow piece of metal, provided with numerous longitudinal slots or openings extending substantially the length of the handle, said hollow piece A being preferably provided in Figs. 1 and 2 with a single ferrule or ring, $a$, and in Fig. 5 with two of them.

To attach the hollow longitudinally-slotted handle A in Figs. 1 and 2 to the guiding-bar B of a bicycle, said bar is provided with the nut $b$, which is screwed at a proper distance upon said bar, as shown. Then the end of the bar is thrust from within through the end opening, A', as far as the nut $b$ will allow, and then the convex nut $c$ is screwed upon the bar against the handle, as shown. This lock-nut $c$ may be dispensed with by riveting the handle onto the bar; or any desired method of attaching the handle may be adopted.

The metal may be nickeled or otherwise ornamented.

By providing this hollow handle with slots longitudinally situated, instead of transversely or otherwise, a very firm grip is secured by the rider, as well as a thorough circulation of air afforded.

Having thus fully described my invention, what I claim, and desire to secure by Letters Patent, is—

The combination, with the hollow longitudinally-slotted handle A and the guiding-bar B of a bicycle, of the internal nut, $b$, and external convex nut, $c$, arranged and constructed substantially as and for the purpose above described.

GEORGE SEELEY KELSEY.

Witnesses:
THOMAS JORDAN,
   *Ironmaster, West Bromwich.*
ARTHUR WRIGHT,
   *Solicitor, 86 New St., Birmingham.*